Figure 1:
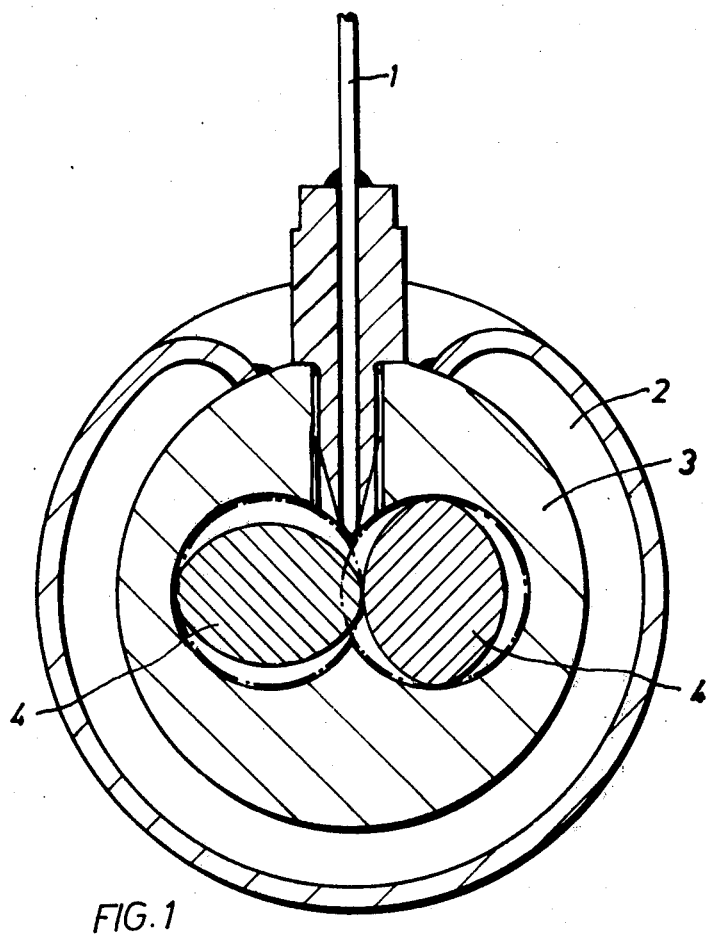

United States Patent [19]

Sutter et al.

[11] 4,058,654

[45] Nov. 15, 1977

[54] PROCESS FOR THE BULK POLYMERIZATION OF α-OLEFINS

[75] Inventors: Hubert Sutter, Berg. Neukirchen; Reinhard Peuker, Dormagen, both of Germany

[73] Assignee: Bayer Aktiengesellschaft, Leverkusen, Germany

[21] Appl. No.: 595,926

[22] Filed: July 14, 1975

[30] Foreign Application Priority Data

July 27, 1974 Germany .............................. 2436259

[51] Int. Cl.$^2$ ......................... C08F 2/02; C08F 10/00; C08F 10/06; C08F 10/08
[52] U.S. Cl. ..................................... 526/159; 526/88; 526/104; 526/106; 526/169; 526/348; 526/349; 526/351
[58] Field of Search ................. 526/88, 104, 106, 159, 526/169; 260/94.9 B, 94.9 D, 94.9 P, 93.7, 88.2 R, 80.78

[56] References Cited

U.S. PATENT DOCUMENTS

| | | | |
|---|---|---|---|
| 2,894,824 | 7/1959 | Lanning | 526/88 |
| 2,963,470 | 12/1960 | Lanning | 526/88 |
| 3,503,944 | 3/1970 | Wisseroth et al. | 526/88 |
| 3,536,680 | 10/1970 | Illing | 526/88 |
| 3,780,139 | 12/1973 | Sutter et al. | 526/88 |

*Primary Examiner*—Alan Holler
*Attorney, Agent, or Firm*—Burgess, Dinklage & Sprung

[57] ABSTRACT

Process for the continuous production of a polymer of an α-olefin monomer. The monomer is polymerized in bulk, employing a screw conveyor as the reactor. The monomer can be in liquid phase when introduced into the conveyor. By the process, the use of diluents is avoided.

18 Claims, 2 Drawing Figures

U.S. Patent        Nov. 15, 1977        4,058,654

PROCESS FOR THE BULK POLYMERIZATION OF α-OLEFINS

BACKGROUND

The invention relates to a continuous process for the polymerisation and copolymerisation of α-olefines in bulk, that is to say in the absence of diluents or suspending agents, by means of organo-metallic mixed catalysts or catalysts containing chromium oxide or molybdenum oxide, using self-stripping twin-screw or multi-screw reactors.

The known large-scale industrial processes for the polymerisation and copolymerisation of α-olefines in the medium and low pressure range by means of organo-metallic mixed catalysts or catalysts containing chromium oxide or molybdenum oxide are in general carried out in the presence of a liquid diluent or suspending agent which must be worked up, and recycled to the process, after separating off the polymer and residual monomer. The recycling of the diluent or suspending agent requires a great deal of technological effort and is very expensive because of the unavoidable losses of diluents or suspending agents which it entails. The same remarks also apply to the recycling of the residual monomer, the amounts of which are normally considerable. In these processes the polymer is in general obtained, after isolation and drying, in a very finely divided and pulverulent form and must normally be brought to a marketable form by subsequent processing in granulating extruders.

Processes for the gas phase polymerisation of α-olefines (see Chem. Eng. Sept. 18, 1972, pages 104-105, and Chem. Eng. Oct. 16, 1972, page 62), in which the monomer, which is treated as recycle gas, assumes the role of a diluent, are also known. In these, the amount of recycle gas must be many times the amount of fresh gas. Both the isolation of the finely divided polymer from a very large amount of gas and its recycling, cooling and purification demand expensive process steps. Here again the polymer which is obtained in a very finely divided form must be converted to a desired form, for example by subsequent processing in granulating extruders.

DT-AS (German Published Specification) 1,247,657 describes a process which is carried out in the presence of preformed polymer as a diluent. The reactors mentioned are special autoclaves, pressure-resistant kneaders or single-screw extruders of which the screw shaft has an axial bore through which a part of the polymer melt is recycled from the output end to the feed zone of the extruder.

The known processes have the disadvantage that they take place in the presence of a diluent, as a result of which the rate of reaction is lowered and a large reaction volume is required. This necessarily leads to a marked worsening of the space-time yield of the reaction, that is to say to a poorer degree of utilisation of the reaction space. A further disadvantage of the known reactions is that polymer deposits in reactors and in working-up vessels are unavoidable and must periodically be removed, at considerable cost.

THE INVENTION

A process for the continuous polymerisation and copolymerisation of α-olefines, optionally with other monomers, in bulk has now been found, in which the catalysts used are organo-metallic mixed catalysts of metal compounds of the elements of groups 4 $b$, 5 $b$, 6 $b$ or 8 and organo-metallic compounds of the elements of groups 1a, 2a and 3a of the periodic table, or catalysts containing oxides of elements of group 6b of the periodic table, characterised in that the reaction is carried out without diluents in self-purging twin-screw or multi-screw reactors at pressures of between 5 and 200 bars, preferably 10 and 100 bars, and with a rising temperature profile of which the lower range lies betwen $-50°$ and $30°$ C, preferably $-20°$ and $30°$ C, and the upper range lies between $50°$ and $200°$ C, preferably $80°$ and $180°$ C.

Here and throughout the description, the term periodic table refers to that illustrated in "Handbook of Chemistry and Physics" 45th Edition table B-2 Cleveland (1964).

The self-stripping or self-purging twin-screw or multi-screw reactors used according to the invention are in principle screw extruders with two or more screws of which the flights intermesh. The screws preferably, but not necessarily, rotate in the same direction. The inner screw diameter is normally constant over the entire length of the screw. The pitch of the flights is in general suited to the requirements of the reaction course, that is to say it can vary in accordance with the volume changes of the material undergoing reaction and can — in the case of pressure build-up zones — even be reversed. If special mixing processes are envisaged in the course of the reaction, for example for admixing stoppers, stabilisers or other additives, the corresponding regions of the screw can be equipped with kneading discs. To assist the temperature regulation it can be advantageous to employ screws constructed as hollow shafts which are connected to a heating and cooling system. Special embodiments of such reactors are described, for example, in German Pat No. 813,154, German Patent No. 862,668 and German Patent No. 940,109, U.S. Pat. No. 2,814,472 and U.S. Pat. No. 3,122,356.

FIG. 1 shows a schematic cross-section and

Figure 2:
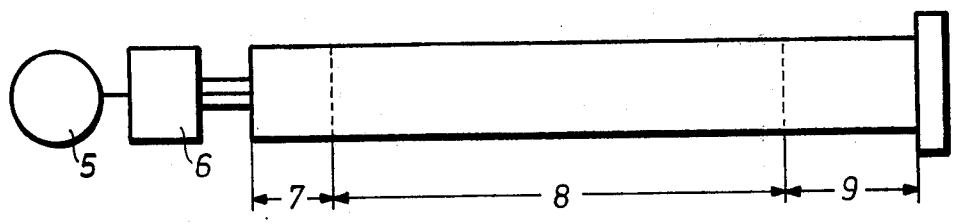

FIG. 2 shows a schematic longitudinal section through a screw reactor suitable for use in the method of the present invention. The housing of the screw reactor 3 very accurately matches the outer circumference of the screws 4 and preferably has several heating and cooling jackets 2 which can be heated and cooled separately. Numerous bores extending as far as the reaction space, and serving to receive temperature probes 1 and admit reaction components are provided over the entire length of the housing. In FIG. 2, the number 5 designates the motor, 6 designates the gearbox of a screw reactor and the numbers 7, 8 and 9 designate individual zones of the reactor to which reference is made in the examples (7 = intake zone; 8 = reaction zone; 9 = mixing zone).

The self-purging screw reactors used in accordance with the process of the invention provide a forced feed, as a result of which thorough intermixing of the material undergoing reaction is achieved, with continuous reformation of the surface, avoidance of inhomogeneities within limited zones, short diffusion paths to the active centres, good temperature regulation and good external heat transfer. Furthermore, the screw reactors used in accordance with the invention achieve plug flow or a narrow residence spectrum of the material undergoing reaction, with defined reaction zones forming, so that no uncontrollably long residence times, which can lead to undesired secondary reactions, result for parts of the material undergoing reaction. Surprisingly, high, practically quantitative, conversions are possible at the short residence times achievable, and consequently the space-time yields are very high.

The size of the screw reactor used according to the invention differs from case to case. Important aspects in selection are the residence time, throughput, temperature regulation, viscosity characteristics and number and nature of the process steps. In the process according to the invention, L/D ratios (L = length and D = diameter of a screw) of up to 30 normally suffice. If, for technological reasons, higher L/D ratios are required, a combination of several screw reactors is advisable.

Examples which may be mentioned of α-olefines which are used for the process according to the invention are $C_2$-$C_5$, e.g. ethylene, propylene, butene-1, pentene-1 and 4-methylpentene-1, preferably ethylene, propylene and butene-1. The α-olefines can be employed individually or as mixtures with one another or as mixtures with other comonomers such as, for example, dicyclopentadiene or isoprene.

As catalysts which are used for the process according to the invention there may be mentioned organo-metallic mixed catalysts of the Ziegler type, as well as catalysts containing oxides of sub-group 6 of the periodic table, for example catalysts containing chromium oxide or molybdenum oxide.

As is known, organo-metallic mixed catalysts of the Ziegler type are obtained on combination of compounds of the metals of sub-groups 4 to 6 or of group 8 of the periodic table with organo-metallic compounds of the elements of groups 1 to 3 of the periodic table of the elements.

In some cases it has proved advantageous to modify the catalyst systems used by additives, such as, for example, Lewis acids or alkyl halides, to boost their activity or selectivity or to achieve special polymer properties.

The organo-metallic mixed catalysts used can be employed as such or in the form of supported catalysts. Catalysts containing chromium oxide or molybdenum oxide are in general used as supported catalysts. Supports which can be used are, for example, aluminium oxide, silicon oxide, aluminium silicate or aluminium phosphate. The catalyst components can be obtained in a manner which is in itself known, for example by impregnating the support with the corresponding salt solutions, by precipitating the active catalyst component in the presence of the support or by conjoint precipitation of such compounds with compounds which form the support. In general, these catalysts are activated by a heat treatment.

The choice of the suitable catalyst system depends, in the process according to the invention, on the task in question. In general, organo-metallic mixed catalysts are preferred since they normally permit lower start temperatures. Catalysts preferentially used for the process according to the invention are organo-metallic mixed catalysts which contain, as components, titanium halides or vanadium halides, preferably titanium trichloride, titanium tetrachloride, vanadium trichloride or vanadium oxychloride and, as further components, aluminium-alkyl compounds or alkyl-aluminium halides with 1–6 carbon atoms in the alkyl radical, preferably triethyl-aluminium, diethyl-aluminium chloride, ethyl-aluminium sesquichloride and triisobutyl-aluminium. The ratio in which the two components are mixed is suitably in the range from 1:0.8 to 1:10.0. The catalyst can be added in different ways according to circumstances. If diluents for the catalyst are required, those diluents which do not interfere if present in the polymer, or are easily removable by degassing, should be chosen, for example paraffin wax or paraffin oil on the one hand or butane and pentane on the other. When using organo-metallic mixed catalyst systems it has proved advantageous to dissolve or disperse the starting components of the catalyst system, where appropriate, in separate portions of monomer and to initiate the polymerisation by bringing regulated streams of these portions together, if appropriate after addition of supplementary amounts of monomer. However, it is also possible to bring together the regulated streams containing the catalyst components, if appropriate together with supplementary amounts of monomer, to undergo a pre-reaction, and feed this mixture into the screw reactor. In some cases it can also be advantageous to prepare the mixed catalysts used, separately outside the reactor. The mixed catalysts thus prepared, or the supported catalysts, are normally added in the form of highly concentrated dispersions in, for example, paraffin oil.

The amounts of catalyst required in the process according to the invention are, as expected, very low because of the high monomer concentration in the reaction mixture and are — given identical catalyst systems — substantially below those for reactions taking place in a diluted system. In addition to cost savings, this has the technological advantage that it is not necessary to remove the catalyst residues from the reaction product.

Where a deactivation of the catalyst system is necessary, as is generally the case with organo-metallic mixed catalysts, this deactivation can be effected by metering a substance suitable for use as a stopper into the reaction mixture shortly before it issues from the screw reactor. Suitable substances of this type are compounds with groups which are reactive towards the catalyst system, such as hydroxyl, carboxyl, amino and carbonyl groups, and the stopper can also possess several such groups, which may be identical or different, and can have chelate-forming properties.

If, furthermore, stabilisers and/or additives such as antistatic agents, blowing agents or crosslinking agents are to be added to the polymer, this can be done in the same manner as described for the stopper and can preferably also be done conjointly therewith. The addition of a deactivator and, where relevant, of additives, is normally effected in bulk, for example as a melt or as a mutual solution of the components, with the aid of an adjustable metering pump, the addition being made into mixing zone 9 (FIG. 2) of the screw reactor. Optimum mixing of the components is achieved through fitting kneading discs in the region of the mixing zone 9 (FIG. 2), such as kneading discs 5 of said U.S. Pat. No. 3,122,356.

Of course, the process according to the invention can be varied within wide limits. For example, the molecular weight can be regulated by suitable regulators such as hydrogen, or copolymers having a block structure can be obtained by spatially separate introduction of a further monomer component.

The process according to the invention exhibits the following advantages over the state of the art:

1. Very high space-time yield
2. The process is simple to manage and very flexible in its application.

3. The recycling and purification of diluents or monomers is dispensed with.
4. No separate process steps are required for deactivation and admixture of additives.
5. The amount of catalyst required is low (since maximum monomer concentration is used); removal of the catalyst residues can be dispensed with.
6. The polymer is obtained in a ready-to-use form without interposition of a further process stage.
7. No polymer deposits are formed in the reaction space; cleaning is therefore not necessary.

EXAMPLES

The following general procedure applies to the examples which are given later.

The reactor used is a self-stripping twin-screw reactor of 1 m length. The screws are made of chrome steel, with an outer diameter of 32 mm and a core diameter of 24 mm; they are two-thread screws, with a pitch of 12 mm in the threaded portion. The last fifth of the screws, corresponding to the mixing zone 9 (see FIG. 2) is fitted with kneading discs. The screws rotate in the same direction and are driven by a motor via a variable speed gearbox. The L/D ratio (length/diameter) of the screw reactor is 31 and the (free) reaction volume is about 450 ml. The reaction housing 3 is surrounded by a cooling and heating jacket 2 (FIG. 1) divided into several zones. The temperature in the reaction space is measured by means of several temperature probes arranged along the reactor housing. The measuring points of the temperature probes are in contact with the reaction mixture.

The monomers correspond to the customary purity requirements for polymerisation with organo-metallic mixed catalysts or supported catalysts containing chromium oxide or molybdenum oxide. In general, the monomers are introduced in the sub-critical range, that is to say in the form of a liquid, with the aid of adjustable metering pumps. The receiver, pump and pipelines for the monomers can, if necessary, be equipped with cooling. The monomer is metered into the intake zone 7 (see FIG. 2), which can also be cooled, of the screw reactor.

The catalyst is metered by means of adjustable metering pumps into the intake zone of the screw reactor; it is metered either in the form of solutions of dispersions of its components in portions of the monomer, or as the complete catalyst in the form of a highly concentrated dispersion in paraffin oil.

The polymerisation is carried out as follows: the monomer or monomer mixure and the monomer part-streams containing catalyst or the catalyst components are metered into the intake zone of the screw reactor, in amounts and ratios corresponding to the requirements. The screw speed is adjusted so that the advance corresponds to the total volume of all the components fed in, which results in optimum utilisation of the screw reactor. The polymerisation rate is regulated both through a temperature profile, which in general rises evenly in the conveying direction, and via changes in the amount and/or ratio of the catalyst, so that complete conversion is reached by the time the mixing zone is entered.

After passing through the mixing zone, in which the catalyst is deactivated and, if desired, the polymer is intimately mixed with additives, the reaction product leaves the screw reactor via a perforated plate. The strands or ribbons which issue are cooled by means of a water bath and granulated or cut.

EXAMPLE 1

The preparation of atactic polybutene-1 was carried out in accordance with the general working instructions described above.

The butene-1 employed as the monomer was fed into the intake zone of the screw reactor, by means of a piston metering pump, at a pressure of about 10 bars and a temperature of $-5°$ C. The amount of butene-1 employed for the individual experiments $a$ to $f$ is shown in Table 1.

The catalyst consisted of $\gamma$-$TiCl_3$/$Al(C_2H_5)_3$, in the molar ratio of 1:1.8 in experiments $a$ and $c$ to $f$, and in the molar ratio of 1:8 in experiment $b$. The catalyst was worked into a paste with carefully dried paraffin oil and metered as a 50% strength paste, by means of a gear pump, into the intake zone of the screw reactor. The amount of catalyst employed in the individual experiments can be seen from Table 1, column 4.

For deactivation and stabilisation, a 1:1 mixture of 2,4-di-t-butyl-p-cresol and triethanolamine was metered into the mixing zone in such amount that the reaction product contained about 0.3–0.5% of the mixture.

Table 1 tabulates the experimental data for the individual experiments.

Table 1

| 1 | 2 | 3 | 4 | 5 | | | 6 |
|---|---|---|---|---|---|---|---|
| | | | | Temperature (° C) Zone | | | |
| Experiment | Monomer (l/hr) | STT (1/l. hr) | RT (min) | mmols of Ti per 100 g of monomer | 7 | 8 | 9 | ML-4 |
| a | 1.8 | 4 | 15 | 1.0 | −5 | 5 – 70 | 90 | 32 |
| b | 1.8 | 4 | 15 | 1.0 | −5 | 5 – 70 | 90 | 38 |
| c | 1.8 | 4 | 15 | 0.7 | 0 | 10 – 70 | 90 | 30 |
| d | 1.8 | 4 | 15 | 0.4 | 0 | 10 – 90 | 100 | 30 |
| e | 2.2 | 4.9 | 12 | 0.5 | 0 | 15 – 100 | 100 | 34 |
| f | 2.6 | 5.8 | 10 | 0.5 | 0 | 15 – 100 | 100 | 36 |

The individual columns in Table 1 give the following data:
1 Amount of monomer
2 STT = space-time throughput
3 RT = residence time
4 mmols of Ti per 100 g of monomer = amount of $TiCl_3$ employed (in millimols per 100 g of monomer)
5 Temperature data for the intake zone 7, reaction zone 8 and mixing zone 9 (compare Figure 2)
6 ML-4=Mooney viscosity (100° C)

The products have a density of about 0.85 g/cm³ and exhibit the behaviour of thermoplastic elastomers. The products obtained are distinguished by good milling characteristics, high Defo values (hardness/elasticity at 80° C:2,750/24), good tensile strength T (22 kp/cm²) and elongation and high modulus E (300%:14 kp/cm²).

EXAMPLE 2

Atactic polybutene-1 was prepared in accordance with the general procedure described above. $TiCl_4$ and $Al(i-C_4H_9)_3$ are used as the catalyst. The two catalyst components were each dissolved in portions of the monomer immediately before use. These solutions and supplementary amounts of monomers were metered into the intake zone of the screw reactor in three part-streams at temperatures of $-5°$ C in experiments $a$ to $c$. In experiment $d$, in accordance with a particular embodiment of the process, the two monomer part-streams containing the catalyst components were combined before entering the screw reactor. (The ratio of the 3 part-streams was regulated so that the catalyst concentrations and Ti/Al ratios indicated in Table 2, column 4 and 4a, were obtained). In experiment $e$, according to a further embodiment of the process, a preformed catalyst system was prepared from the same catalyst components (TiCl$_4$ and Al(i-C$_4$H$_9$)$_3$ mixed at room temperature whilst stirring, aged for 15 minutes, solvent decanted, residue worked into a paste with paraffin oil) and metered in as in Example 1.

Table 2 shows the data relating to the examples:

Table 2

| 1 Experiment | 2 Butene l/hr | 3 STT 1/l. hr | 4 RT min | mmols of Ti per 100 g of monomer | 4a Ti/Al | 5 Temperature °C Zone 7 | 8 | 9 | 6 ML-4 |
|---|---|---|---|---|---|---|---|---|---|
| a | 1.1 | 2.4 | 25 | 0.7 | 1:1.8 | 0 | 5 – 70 | 90 | 49 |
| b | 1.7 | 3.1 | 19 | 0.8 | 1:2 | 0 | 5 – 80 | 90 | 50 |
| c | 1.7 | 3.4 | 17.5 | 1.0 | 1:1.9 | 0 | 5 – 80 | 90 | 49 |
| d | 2.0 | 4.4 | 12 | 0.7 | 1:1.8 | 0 | 5 – 80 | 90 | 50 |
| e | 2.2 | 4.9 | 13.5 | 0.5 | 1:1.8 | −5 | 5 – 70 | 90 | 52 |

The significance of columns 1 to 6 is the same as in Table 1; column 4a indicate the Ti/Al ratio of the catalyst added.

The products are comparable with the products according to Example 1 in respect of their physical properties and their processability.

EXAMPLE 3

The preparation of an ethylene-propylene copolymer was carried out analogously to the general procedure described above. In experiment a to d, monomer mixtures of about 80% by weight of propylene and about 20% by weight of ethylene were employed with varying proportions of hydrogen as a molecular weight regulator (compare column 1a). In experiment e, 3% of dicyclopentadiene was also added to the starting material. The monomer mixtures employed were polymerised with a catalyst of γ-TiCl$_3$/Al(C$_2$H$_5$)$_3$ in the molar ratio of Ti/Al = 1:1.8. The catalyst was worked into a paste with dried paraffin oil and metered, as a 50% strength paste, into the intake zone of the screw reactor by means of a gear pump. The monomer mixture was fed into the intake zone of the screw reactor with the aid of a piston metering pump, at a pressure of 10–20 bars and a temperature of −25° C.

For deactivation and stabilisation, a 1:1 mixture of 2,4-di-t-butyl-p-cresol and triethanolamine was metered into the mixing zone in such amount that the reaction product contained about 0.3 to 0.5% of the mixture.

The data for the individual experiments are summarised in Table 3:

Table 3

| 1 Experiment | Monomer l/hr | 1a % by volume of H$_2$ | 2 STT 1/l. hr | 3 RT min | 4 mmols of Ti per 100 g monomer | 5 Temperature °C Zone 7 | 8 | 9 | 6 M.I. |
|---|---|---|---|---|---|---|---|---|---|
| a | 4.5 | 0 | 10 | 6 | 0.25 | −15 | 0-80 | 90 | 0.8 |
| b | 3.8 | 0.01 | 8.5 | 7 | 0.5 | −15 | 0-90 | 90 | 1 |
| c | 3.8 | 0.1 | 8.5 | 7 | 0.5 | −15 | 0-90 | 90 | 4-6 |
| d | 3.8 | 1 | 8.5 | 7 | 0.5 | −15 | 0-90 | 90 | 10 |
| e | 4.1 | 0 | 9 | 6.5 | 1.5 | −15 | 5-90 | 90 | — |

The significance of columns 1 to 5 is the same as in Table 1. Column 1a contains the proportion of hydrogen in the monomer mixture and column 6 gives the melt indices at 2.16 kp and 190° C (M.I. = melt index) as a parameter for assessing the molecular weight. The products obtained show, though less markedly than the atactic polybutenes of Examples 1 and 2, elastomeric properties which become more pronounced with increasing melt index. A product with M.I. = 2.5 exhibits a Mooney viscosity ML-4 (100° C) of about 60. The product of experiment 4e could be crosslinked with sulphur.

EXAMPLE 4

Polypropylene was prepared analogously to the general procedure described above.

The monomer used was propylene, which was polymerised with the same catalyst system as in Example 3. In experiment b, the propylene employed additionally contained 0.01% by volume of hydrogen. The propylene was metered by means of a piston metering pump, at a temperature of −20° C and a pressure of °bars, into the intake zone of the screw reactor. The deactivation and stabilisation of the reaction mixture was carried out as in Example 3.

Because of the high melting range of polypropylene, a short extension piece, which could be heated, was inserted between the mixing zone and the die plate, in order to be able to adjust the plasticity of the material, by post-heating at 170°–180° C, so as to enable the material to issue satisfactorily from the die plate.

Table 4 shows the experimental data (the significance of the individual columns is the same as in Example 3)

Table 4

| 1 Experiment | Monomer l/hr | 2 STT 1/l. hr | 3 RT min | 4 mmols of Ti per 100 g of monomer | 5 Temperature °C Zone 7 | 8 | 9 | 6 M.I., 2.16/ 190° C |
|---|---|---|---|---|---|---|---|---|
| a | 1.8 | 4 | 15 | 1.0 | −10 | 30–100 | 160 | 0.7 |
| b | 2 | 4.4 | 13.5 | 0.9 | −10 | 40–110 | 160 | 2.5 |

The heptane-soluble content of the experimental products is about 20%. The polymers obtained can be converted to mouldings having good mechanical properties.

What is claimed is:

1. Process for continuous production of a polymer of an α-olefin monomer by bulk polymerization which comprises continuously introducing the monomer and a catalyst for the polymerization into the feed end portion of a multi-screw conveyor for transport of the monomer and catalyst in admixture through the conveyor and bulk polymerization of the monomer during said transport, the mixture of monomer and catalyst during said transport being under a pressure of 5–200 bars, the temperature of said monomer during said transport following a rising profile with the temperature adjacent the feed end of said multi-screw conveyor being −50° to 30° C and the temperature adjacent the discharge end thereof being 50° to 200° C.

2. Process of claim 1, wherein the catalyst is an organo-metallic mixed catalyst containing a metal compound of an element of sub-groups 4b, 5b, 6b or of group 8 of the periodic table and an organo-metallic compound of an element of groups 1a, 2a or 3a of the periodic table, or a catalyst containing an oxide of sub-group 6b of the periodic table.

3. Process of claim 1, wherein polymerizable monomer other than said α-olefin monomer is introduced into the feed end portion of the multi-screw conveyor for copolymerization with said α-olefin monomer.

4. Process of claim 1, wherein the monomer when introduced into the conveyor is in liquid phase.

5. Process of claim 3, wherein said α-olefin and polymerizable monomer are in liquid phase when introduced into the conveyor.

6. Process of claim 2, wherein the catalyst is an organo-metallic mixed catalyst, the components of the mixed catalyst are dissolved or dispersed separately from one another in separate portions of monomer and the polymerization is initiated by bringing streams of these portions together, or together with supplementary amounts of monomer in metered ratio.

7. Process of claim 6, wherein the streams containing the catalyst components are brought together to undergo a pre-reaction and the resulting mixture is fed into the screw reactor.

8. Process of claim 2, wherein the components of the mixed catalyst are mixed separately from the monomer outside the screw conveyor.

9. Process of claim 1, wherein the α-olefin is ethylene.

10. Process of claim 1, wherein α-olefine is propylene.

11. Process of claim 1, wherein α-olefine is butene-1.

12. Process of claim 1, wherein the α-olefine is 4-methylpentene-1.

13. Process of claim 3, wherein the different monomers are fed into the screw reactor at spatially separate positions.

14. Process of claim 1 wherein the polymerization is effected at a pressure of from 10 to 100 bars.

15. Process of claim 1, wherein the lower temperature of the rising temperature profile lies between $-20°$ and $30°$ C.

16. Process of claim 1, wherein the upper temperature of the rising temperature profile lies between $80°$ and $180°$ C.

17. Process of claim 1, wherein the ratio of the length to diameter of the screws of the conveyor is up to 30.

18. Process of claim 1, wherein the conveyor is a self-purging, forced feed conveyor.

* * * * *

UNITED STATES PATENT AND TRADEMARK OFFICE
CERTIFICATE OF CORRECTION

PATENT NO. : 4,058,654
DATED : November 15, 1977
INVENTOR(S) : Sutter et al

It is certified that error appears in the above-identified patent and that said Letters Patent are hereby corrected as shown below:

[73] Assignee, Title page, "Bayer Aktiengesellschaft, Leverkusen, Germany" should read -- Erdölchemie GmbH, Koeln, Germany --.

Signed and Sealed this

Third Day of October 1978

[SEAL]

Attest:

RUTH C. MASON
*Attesting Officer*

DONALD W. BANNER
*Commissioner of Patents and Trademarks*